United States Patent [19]

Kotler et al.

[11] Patent Number: 5,627,800
[45] Date of Patent: May 6, 1997

[54] METHOD AND APPARATUS FOR DETERMINING POSITION OF A MOVING OBJECT IN A TANK

[76] Inventors: Seymour R. Kotler, 1054 St. Margaret's Dr., Annapolis, Md. 21401; Harry T. Roman, 25 Laurel Ave., East Orange, N.J. 07017

[21] Appl. No.: 188,311

[22] Filed: Jan. 28, 1994

[51] Int. Cl.$^6$ .................................................. G01S 3/80
[52] U.S. Cl. ........................ 367/127; 367/120; 367/907
[58] Field of Search ............................ 367/99, 118, 120, 367/127, 907, 910, 129, 908, 902; 73/290 V; 165/11.2; 376/258, 249

[56] References Cited

U.S. PATENT DOCUMENTS

| | | | |
|---|---|---|---|
| 1,961,767 | 6/1934 | Key | 367/127 |
| 2,019,497 | 11/1935 | Kuntze | 181/142 |
| 2,261,252 | 11/1941 | Hawk | 340/992 |
| 2,366,800 | 1/1945 | Norrman | 367/128 |
| 2,426,657 | 9/1947 | Longfellow et al. | 367/12 |
| 2,515,472 | 7/1950 | Rich | 367/137 |
| 3,004,780 | 10/1961 | Main | 285/242 |
| 3,005,002 | 10/1961 | Berkelhammer | 558/99 |
| 3,130,385 | 4/1964 | Galloway | 367/120 |
| 3,205,475 | 9/1965 | Foss | 367/117 |
| 3,213,410 | 10/1965 | Hagemann | 367/6 |
| 3,218,553 | 11/1965 | Peterson et al. | 368/119 |
| 3,226,719 | 12/1965 | Chown | 342/451 |
| 3,270,345 | 8/1966 | Schauffler | 342/464 |
| 3,299,398 | 1/1967 | Hersey et al. | 367/3 |
| 3,339,204 | 8/1967 | Rail | 342/443 |
| 3,383,651 | 5/1968 | Koblick | 367/127 |
| 3,421,138 | 1/1969 | Moulin | 367/127 |
| 3,460,060 | 8/1969 | Abruzzo | 367/6 |
| 3,515,342 | 6/1970 | Brunk | 364/449 |
| 3,526,831 | 9/1970 | Smith | 324/559 |
| 3,559,161 | 1/1971 | Raudsep | 367/117 |
| 3,603,145 | 9/1971 | Morris | 73/155 |
| 3,731,264 | 5/1973 | Campbell et al. | 367/12 |
| 3,745,519 | 7/1973 | Klein et al. | 367/117 |
| 3,792,424 | 2/1974 | Nakatsuji et al. | 367/117 |
| 3,800,217 | 3/1974 | Lowrance | 324/557 |
| 3,860,900 | 1/1975 | Scudder | 367/6 |
| 3,928,840 | 12/1975 | Spindel et al. | 367/117 |
| 4,000,466 | 12/1976 | Scouten et al. | 368/113 |
| 4,031,500 | 6/1977 | Parent | 367/117 |
| 4,051,350 | 9/1977 | Parent | 364/432 |
| 4,055,830 | 10/1977 | Wilson et al. | 367/128 |
| 4,078,510 | 3/1978 | Morgan | 114/144 A |
| 4,097,837 | 6/1978 | Cyr | 367/6 |
| 4,101,726 | 7/1978 | Griffiths | 373/165 |
| 4,109,523 | 8/1978 | Teyssandier | 73/194 A |
| 4,110,726 | 8/1978 | Dorrance et al. | 367/6 |
| 4,144,517 | 3/1979 | Baumoel | 73/290 V |
| 4,160,386 | 7/1979 | Jackson et al. | 73/625 |
| 4,170,891 | 10/1979 | Elsner | 73/1 R |
| 4,203,324 | 5/1980 | Baumoel | 73/290 V |
| 4,229,809 | 10/1980 | Schwalbe | 367/6 |
| 4,300,401 | 11/1981 | Pedersen | 73/861.31 |
| 4,317,005 | 2/1982 | de Bruyne | 178/19 |
| 4,352,167 | 9/1982 | Hashimoto et al. | 367/127 |
| 4,441,517 | 4/1984 | Phillips | 134/113 |
| 4,516,226 | 5/1985 | Peynaud et al. | 367/6 |
| 4,543,525 | 9/1985 | Boryta et al. | 324/559 |
| 4,555,779 | 11/1985 | Roberts | 367/19 |
| 4,593,569 | 6/1986 | Joy | 73/636 |
| 4,635,236 | 1/1987 | Roberts | 367/19 |
| 4,719,407 | 1/1988 | Converse et al. | 324/559 |

(List continued on next page.)

*Primary Examiner*—Ian J. Lobo
*Attorney, Agent, or Firm*—Sughrue, Mion, Zinn, Macpeak & Seas

[57] ABSTRACT

A method and apparatus for determining position of a vehicle in a tank of fluid. At least one transducer is disposed on the vehicle and a plurality of transducers are disposed on the outside wall of the tank. The transducers are arranged in a substantially common plane. The travel time of energy can be measured between any two of the transducers. Accordingly, the velocity profile of the liquid can be determined based on travel times measured between the transducers on the tank and position can be determined based on travel times measured between the transducers on the vehicle and the transducers on the tank.

34 Claims, 9 Drawing Sheets

U.S. PATENT DOCUMENTS

| | | | |
|---|---|---|---|
| 4,725,785 | 2/1988 | Converse et al. | 324/559 |
| 4,741,038 | 4/1988 | Elko et al. | 381/92 |
| 4,762,001 | 8/1988 | Wuttke | 73/597 |
| 4,837,578 | 6/1989 | Gammell | 342/194 |
| 4,894,810 | 1/1990 | Jukkala | 367/118 |
| 4,905,210 | 2/1990 | Owen | 367/128 |
| 4,924,446 | 5/1990 | Cyr | 367/6 |
| 4,933,915 | 6/1990 | Bostrom | 367/99 |
| 5,052,215 | 10/1991 | Lewis | 73/40.5 A |
| 5,077,701 | 12/1991 | Lill | 367/98 |
| 5,079,751 | 1/1992 | Woodward | 367/96 |
| 5,095,748 | 3/1992 | Gregory et al. | 73/290 V |
| 5,205,174 | 4/1993 | Silverman et al. | 73/623 |

METHOD AND APPARATUS FOR DETERMINING POSITION OF A MOVING OBJECT IN A TANK

BACKGROUND OF THE INVENTION

1. Field of the Invention:

The subject invention relates to a method and apparatus for detecting the position of a movable object in a liquid-filled tank. In particular, the invention is a method and apparatus for accurately detecting the position of a movable object, such as a cleaning or inspection vehicle, which is submerged in a liquid-filled tank, such as an oil tank or the like.

2. Description of the Related Art:

It is well known to utilize acoustic methods for detecting the position of a floating vessel. For example, U.S. Pat. No. 4,905,210, which is incorporated herein by reference, discloses a system wherein a plurality of hydrophones are placed around the perimeter of a liquid impoundment. Acoustic travel time from the hydrophones to a transmitter located on a vessel floating in the impoundment is measured and the position of the floating vessel is determined by the intersection of arcs respectively defined by the distances which correspond to the measured travel times.

Also, it is known to determine the position of an underwater object utilizing acoustic techniques. For example, U.S. Pat. No. 3,928,840, which is incorporated herein by reference, discloses a system wherein three hydrophones are moored underwater and acoustic travel times from the hydrophones are continuously measured so as to determine the position of the object through a triangulation technique.

Also, the wide use of petroleum products, petrochemicals and various other liquid chemicals has required that large metal or other thin-walled storage tanks be constructed so as to store the liquids before distribution. Often these tanks are relatively complicated devices having pumps, fill pipes, ventilation systems, roof support systems, and the like. Also, these tanks are very large, often several hundred feet in diameter. Sediment must be periodically removed from these tanks to avoid contamination of the liquid stored therein. In addition, these tanks must be inspected for flaws periodically to avoid very expensive and environmentally hazardous leaks. For example, American Petroleum Institute (API) standard 635 requires that all tanks storing hydrocarbons be periodically inspected for flaws that can lead to leakage. It is difficult and costly to drain, clean and purge these large tanks for cleaning or inspection.

In view of this, small inspection and cleaning vehicles have been developed which can enter a large tank through a manway or other opening. Such vehicles are often equipped with a video camera or ultrasonic inspection systems as well as a cleaning apparatus. For example, one such system is described in U.S. Pat. No. 5,205,174. These vehicles are remotely controlled to move along the bottom of the tank and have aided in compliance with standards such as API 635 to a great degree. However, the position of the vehicle in the tank must be accurately determined at all times or else it is difficult to accomplish a cleaning operation efficiently. Also, if defects are found in the tank, the precise position of the vehicle must be known in order to determine the position of the defect and remedy the situation. Finally, it is necessary to precisely navigate around pumps and fill pipes which are disposed inside the tank.

Techniques similar to those described above have been used for tracking the position of a submerged cleaning/inspection vehicle in a tank. However, these methods are not desirable for use in such a situation because of several drawbacks. In particular, the tanks are generally exposed to the sun, which causes temperature gradients to form within the liquid in the tank. In other words, the liquid in the tank which is closest to the side thereof which is exposed to the sun will be at a higher temperature than the liquid which is further from the exposed side. Such a temperature gradient will cause erroneous position measurements in an acoustic system because the acoustic velocity in fluids changes significantly with temperature. Agitating the fluid in the tank will help to eliminate temperature gradients but severely hinders the cleaning process because the sediment will be stirred up from the bottom of the tank. Also, known detection methods have required that transducers be placed in contact with the liquid. This is not practical in large tanks because it necessitates insertion of the transducers into the tank or the formation of holes in the sides of the tank. Finally, the geometry of tanks cause problems such as insonification or "ringing" and errors due to the reflection and transmission of sound by the sides of the tank and interference due to mechanisms and structures in the tank, such as pumps and fill pipes.

SUMMARY OF THE INVENTION

In view of the above, it is an object of the invention to provide a system for detecting the position of a submerged vehicle which can accurately correct for temperature gradients which are present in the liquid.

It is a further object of the invention to provide a system for detecting the position of a vehicle submerged in a tank without the need for placing transducers in the tank or forming openings in the tank.

It is a still further object of the invention to provide a system for detecting the position of a vehicle submerged in a tank which can accurately detect position regardless of the geometry of the tank or other devices contained in the tank.

In order to achieve the objects above, the invention utilizes a plurality of acoustic transducers which are connected to the outside surface of a tank by a fluid coupling. Each transducer is capable of transmitting and receiving acoustic energy. The use of a fluid coupling allows the transducer to reliably transmit and receive compressional waves to and from the liquid in the tank while acting as a shear filter to prevent the reception of acoustic energy which has traveled through the walls of the tank. In addition, the transducers mounted on the wall of the tank can be utilized to provide a map of the velocity structure of the fluid in the tank so as to correct for measurement error due to temperature gradients in the tank.

The vehicle of the invention has at least two acoustic transducers mounted thereon. These transducers operate in cooperation with the transducers on the tank so as to determine the position and orientation of the vehicle by measuring acoustic travel time between the various sensors. Also, the transducers on the vehicle can be operated in cooperation with each other to verify or correct the measured velocity structure of the fluid in the tank because the distance between the transducers on the vehicle is accurately fixed. In addition, the transducers on the vehicle and on the tank are directionally biased so as to minimize the effects of reverberation, isonification, echoes and multi-path effects.

DETAILED DESCRIPTION OF THE PREFERRED EMBODIMENT

Figure 1:
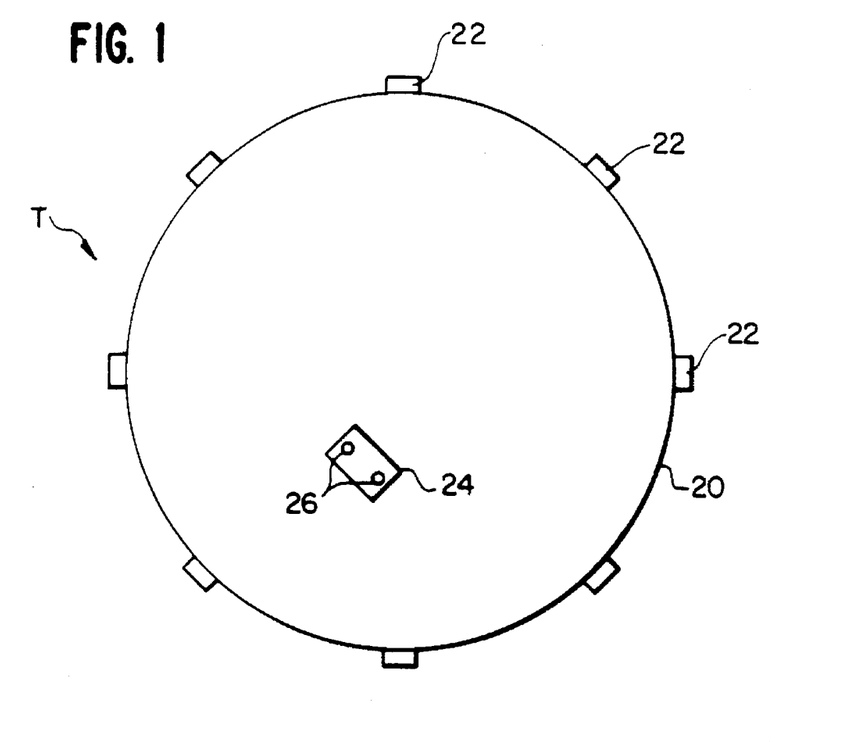
FIG. 1 is a top view of a tank utilizing the preferred embodiment of the invention.

FIG. 1 illustrates a preferred embodiment of the invention. Tank T has side wall 20 and is substantially round as viewed from the top. Tank T has a liquid such as heating oil disposed therein. Vehicle 24 has been inserted in Tank T for the purpose of cleaning, inspection, or the like. Of course, vehicle 24 is equipped with known apparatus for conducting its intended purpose. Also, the operation of vehicle 24 can be controlled from a remote location, such as a mobile operator's panel (not shown) located proximate tank T, to navigate vehicle 24 along the bottom of tank T.

Figure 2:
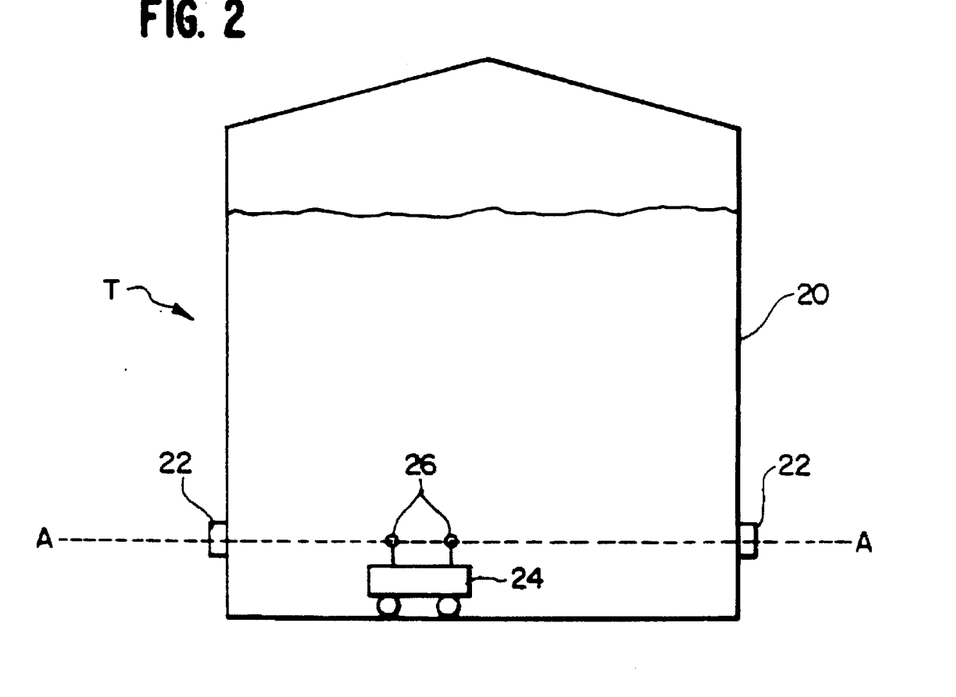
FIG. 2 is a side view of a tank utilizing the preferred embodiment of the invention.

Vehicle 24 has two transducers 26 disposed proximate ends thereof. Each transducer 26 is capable of transmitting acoustic energy as well as receiving acoustic energy. Also, several transducers 22 are disposed on the outside surface of wall 20 so as to extend around the circumference of tank T. Each transducer 22 is also capable of transmitting and receiving acoustic energy. In the preferred embodiment, as can be seen in FIG. 2, transducers 22 are disposed at a height which substantially corresponds to the height of transducers 26. Since vehicle 24 always remains on the bottom of tank T, as a practical matter, it is very easy to determine the height of transducers 26 and to properly position transducers 22.

Distance between two points can be measured by the following equation:

$$D = V \times t, \quad (1)$$

where;

D is distance,

V is the velocity of sound in the particular medium; and t is the time required for sound to travel from one point to the other.

Accordingly, the precise location and orientation of vehicle 24 relative to transducers 22 can be detected by measuring the time it takes acoustic energy to travel from transducers 22 to transducers 26. In other words, since the location of each of the transducers 24 and the velocity of sound in the fluid can be readily determined, the position of each of the transducers 26 can be detected by radiating acoustic energy from one or more of transducers 26 and measuring the time it takes the same acoustic energy to be received at each of transducers 22. If the position of transducers 26 is determined, the position and orientation of vehicle 24 can be easily determined because transducers 24 are fixed at known locations on vehicle 24.

Figure 3A:
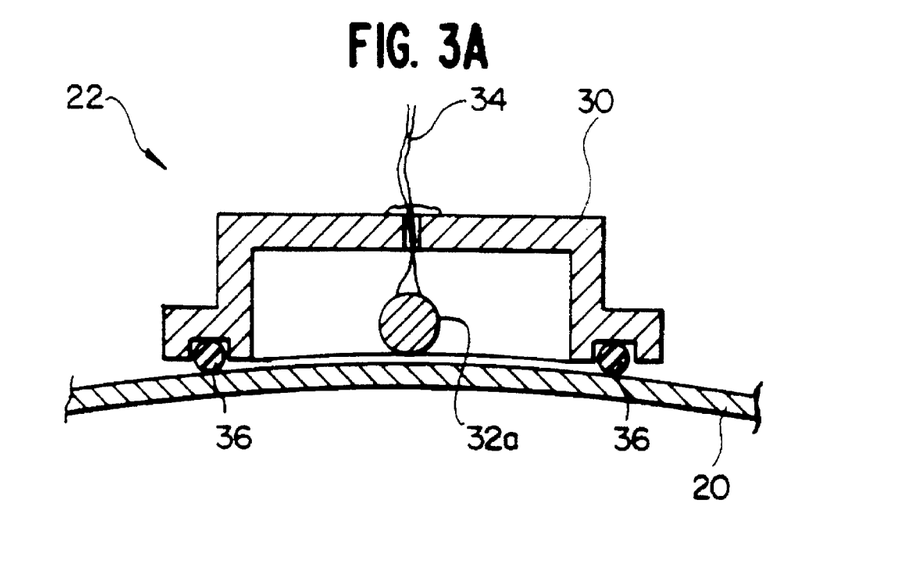
FIG. 3A is a top cross-sectional view of an acoustic transducer utilized in the preferred embodiment.
Figure 3B:
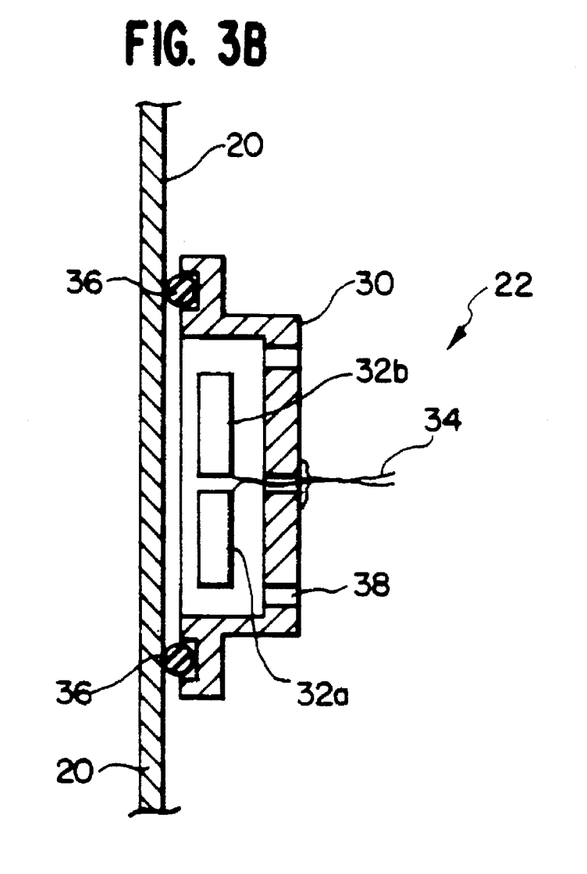
FIG. 3B is side cross-sectional view of an acoustic transducer utilized in the preferred embodiment.

FIGS. 3A and 3B illustrate a single transducer 22. Housing 30 has transducer elements 32a and 32b disposed therein. Transducer element 32a is capable of transmitting acoustic energy when it is energized with an electrical signal via wires 34. Transducer element 32b is capable of receiving acoustic energy and applying a corresponding electrical signal to wires 34. Seals 36 are disposed on housing 30 so as to allow a liquid tight seal to be effected between housing 30 and wall 20 of tank T when housing 30 is held against wall 20. Housing 30 can be secured to wall 20 by the magnetic force of a magnet or with appropriate straps, a suction device or the like (not illustrated).

Before or after housing 30 is secured to an outer surface of wall 20, fluid (such as water or oil) is introduced into housing 30 through apertures 38. Accordingly, transducer elements 32 can be coupled to wall 30 through the fluid. This offers several advantages. In particular, a reliable and efficient acoustic coupling is accomplished between transducer elements 32a and 32b and wall 20. More significantly, because the liquid cannot sustain a shear force, only compressional acoustic waves will be imparted to transducer element 32b and only compressional acoustic waves will be imparted to wall 20 from transducer element 32a. This serves to minimize the magnitude of acoustic energy received which has traveled along wall 20 and thus allows energy which has traveled along wall 20 to be easily discriminated.

Figure 4:
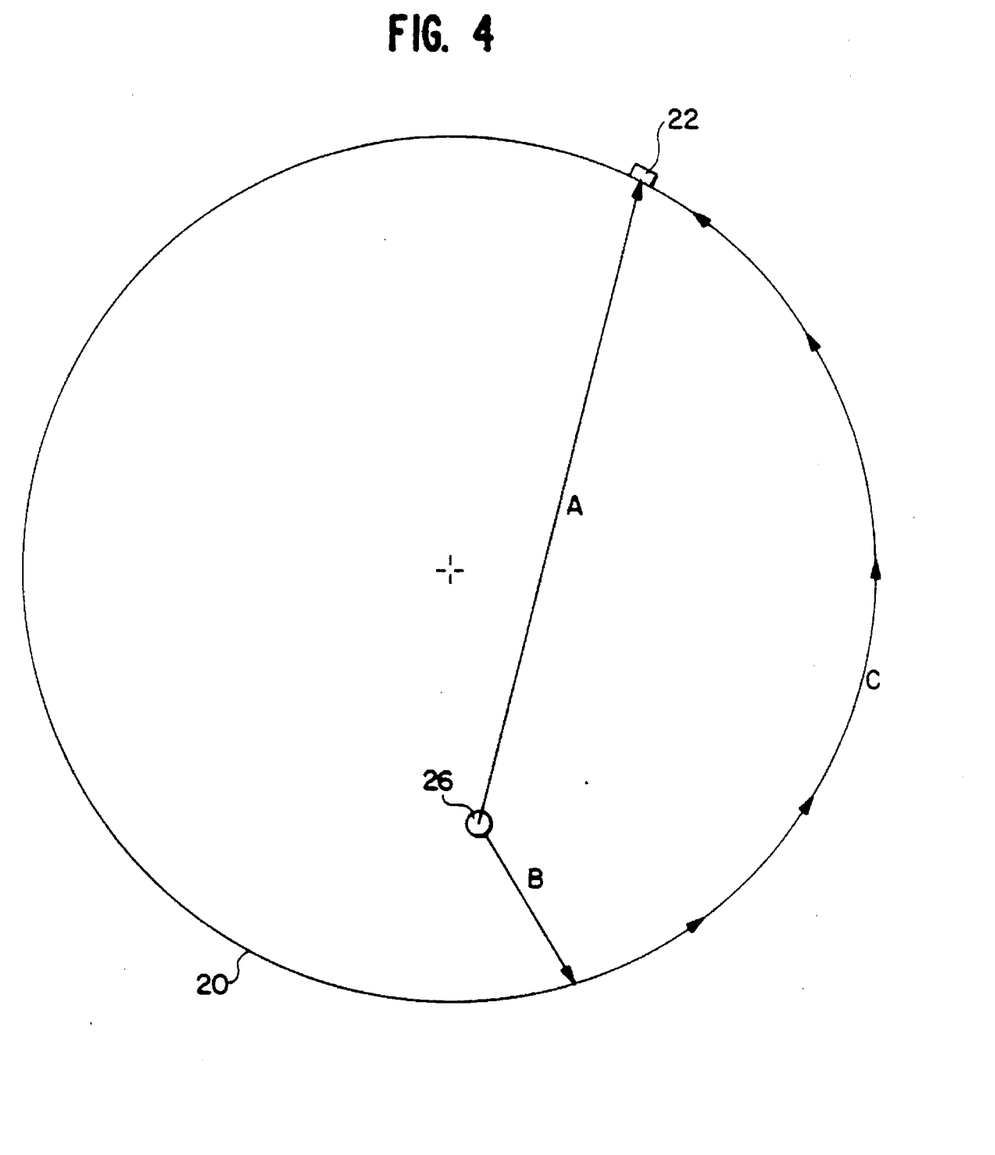
FIG. 4 illustrates various paths through which acoustic energy can travel in a tank.

Such discrimination is desirable. In particular, as illustrated in FIG. 4, it is possible for acoustic energy transmitted by one of transducers 26 to travel through an arbitrary path B to wall 20, and then through path C around wall 20 to be received at one of transducers 22. Of course, detection of this acoustic energy will yield an erroneous position of transducer 26. In most cases, acoustic energy traveling along wall 20 will be detected at times well before an expected range of time because of the high acoustic velocity in the steel tank well. Accordingly, a simple time gate coupled to the detection circuitry can often eliminate error due to inappropriate paths of travel.

However, in some cases such gate discrimination will not be effective. The time $T_A$ required for acoustic energy emitted from transducer 26 to travel through path A and be received by transducer 22 can be expressed by:

$$T_A = A/V_O \quad (2)$$

where;

$V_O$ is the acoustic velocity of the liquid in tank T. The time $T_{BC}$ required for acoustic energy emitted from transducer 26 to travel through paths B and C and be received by transducer 22 can be expressed by:

$$T_{BC} = B/V_O + C/V_S \quad (3)$$

where;

$V_S$ is the acoustic velocity of steel (assuming wall 20 is made of steel).

Accordingly, if $A/V_O$ is approximately equal to $B/V_O + C/V_S$, a gate device will not be able to discriminate the acoustic energy which has travelled through inappropriate path B+C. Since typically, $V_S = 4.3 V_O$, such errors will occur if A=B+[C/4.3]. In view of this, it is desirable to acoustically couple transducer elements 32a and 32b to wall 20 by virtue of fluid because acoustic energy traveling along wall 20 will tend to generate primarily a shear component of energy at transducer element 32a. Since the fluid coupling cannot sustain such a shear component, the magnitude of acoustic energy received at transducer element 32a, due to sound which has traveled along wall 20, will be very low and can thus be discriminated by virtue of a threshold level discrimination circuit.

In addition, undesirable acoustic reception can be minimized by designing transducers 22 and 26 to be directional in both transmission and reception in accordance with the specific application. In particular, if transducers 22, on the outside of the tank, are arranged so as to be essentially in a common plane with transducers 26, on vehicle 24, any acoustic energy from above or below the common plane must be bouncing from the fluid/atmosphere transition surface, the top of the tank, or the bottom of the tank. Of course, reception of such acoustic energy will yield an erroneous result if utilized for a position calculation.

To avoid reception of acoustic energy which has bounced (i.e. is not direct), transducer element 32a (see FIG. 3b) is configured as a dipole oriented vertically so as to cause transducer element 32a to transmit acoustic energy directionally in the common plane defined by the transducers 22 and 26 while attenuating any transmission in other directions. In addition, transducer elements 32b (see FIG. 3b) are configured as dipoles oriented horizontally so as to cause transducer element 32b to receive acoustic energy directionally from central portions of the tank while attenuating any acoustic energy received through tank wall 20 or which has bounced off of tank wall 20. Also, transducer elements of transducers 26 can be directional in a similar manner or any other manner which tends to reduce the reception of undesirable signals.

Another source of error in position measurements which are based on acoustic travel times arises from temperature gradients which can develop in the fluid, because the velocity of acoustic energy through fluids varies significantly (±5 ft./sec./°F.) as the temperature of the fluid changes. Accordingly, any position detection system must be calibrated based upon the actual temperature of the fluid at the time of measurement.

However, difficulties arise in such calibration when a position detection system is utilized in conjunction with a large tank of fluid. In particular, during the course of the daylight hours, the sun will warm varying sides of tank T and will thus cause fluid in portions thereof which are proximate the currently irradiated side to have a temperature which is higher than fluid at portions of the tank which are remote from that side. Accordingly, unpredictable temperature gradients can develop in tank T. Agitation of the fluid can remove the temperature gradients. However, agitation of a large tank is impractical and will also stir up sediment from the bottom of tank T. Accordingly, agitation is not acceptable in a system which is designed to remove sediment from the bottom of the tank or visually inspect the tank.

In view of the above, in order to properly calibrate a position detection system, a velocity distribution (which corresponds to the temperature gradient) of the fluid in the tank must be accurately determined. In the preferred embodiment, this can be accomplished by transmitting acoustic energy from each transducer 22 to each of the remaining transducers 22 and calculating the acoustic velocity between each transducer 22 and the other transducers 22. This can be easily performed since the precise relative position of each transducer 22 is known (because transducers 22 are placed on wall 20 using a guide device, measuring device, or even through known surveying techniques). Of course, the more transducers 22 utilized, the more velocity measurements the system can make and the more accurately the velocity distribution can be calculated. On the other hand, a moderate number of transducers 22 is sufficient. Also, the velocity distribution can be verified and corrected by measuring the acoustic travel time, and calculating the velocity, between transducers 26, which are located at fixed locations on vehicle 24. Vehicle 24 can be moved and this process can be repeated until an accurate "map" of the velocity distribution has been generated. Subsequently, any position measurement can be corrected based on the calculated velocity distribution.

Figure 6:
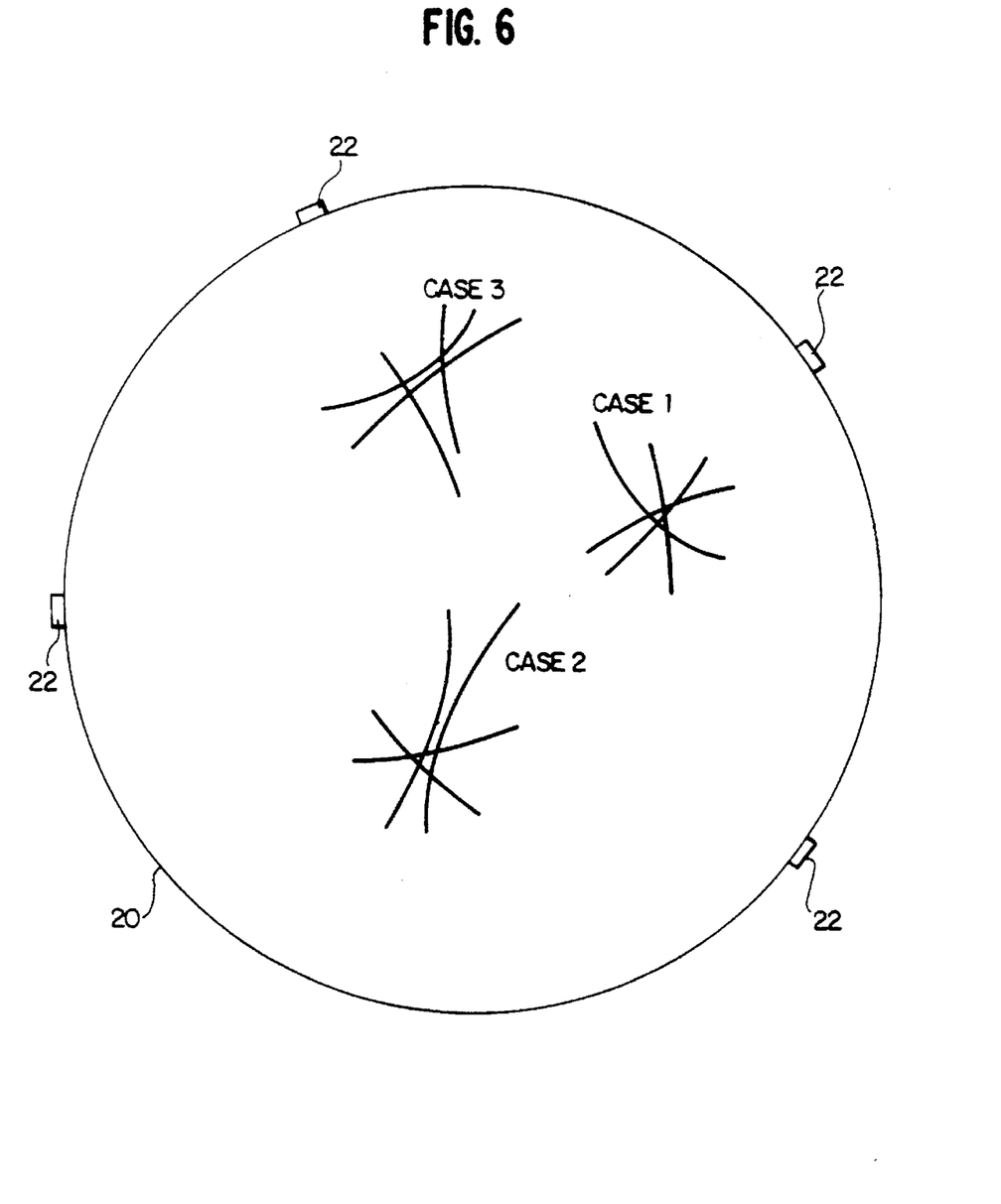
FIG. 6 illustrates possible errors in position measurement.

After the system has been calibrated in the manner described above, actual vehicle position and orientation detection can be accomplished by calculating the distance between each transducer 22 and each transducer 26 by measuring the acoustic travel times between the transducers 26 and the transducers 22. In such a mode, the acoustic energy is emitted from transducers 26 and detected by transducers 22. The energy emitted by each of transducers 26 can be distinguished by time or phase multiplexing or any other appropriate method. Of course, each individual measurement of travel time/distance between a transducer 22 and a transducer 26 will yield an arc, at some point along which the transducer 26 is located. The intersection of the various arcs obtained through measurements taken at plural transducers 22 gives the precise location of the transducer 26. Several of these arcs are illustrated in FIG. 6.

However, errors inevitably occur due to constantly changing temperatures, undesired travel paths, deviation in the shape of tank T, imprecise placement of transducers 22, obstructions in tank T, and other site specific variables. As is apparent from cases 1–3 illustrated in FIG. 6, the arcs may not always intersect at a single point due to these errors. However, because a plurality of measurements are taken (one from each transducer 26 to each transducer 22) errors in position detection will ordinarily be small. Also, an average, or other computational adjustment can be accomplished on the various position measurements. Further, measurements which are not within a certain limit value with respect to the others can be discarded. Because several measurements are made at each position, the remaining measurements will yield an accurate result.

Figure 5:
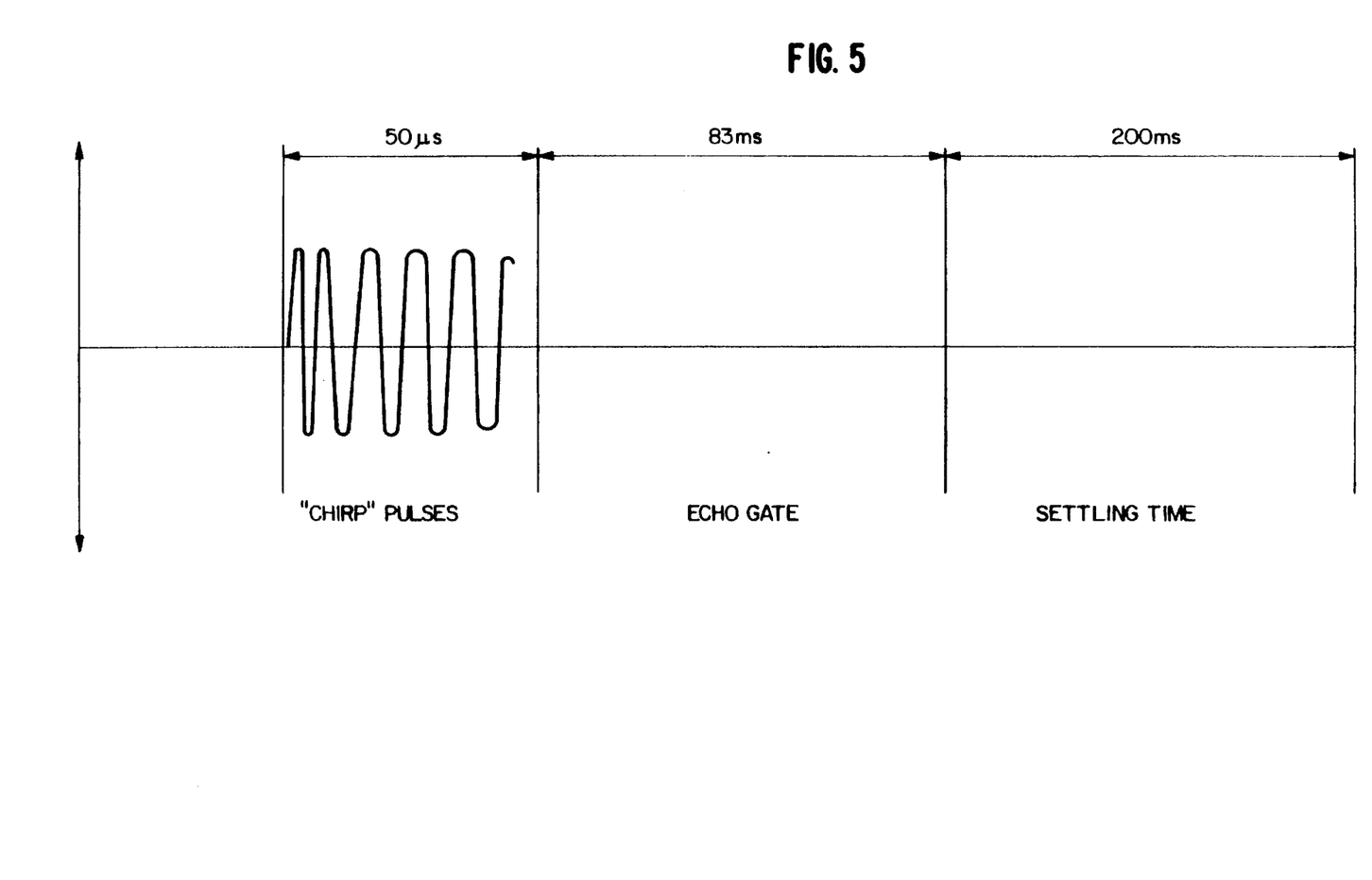
FIG. 5 illustrates the timing of the acoustic wave generated by the transducers of the preferred embodiment.

While in calibration mode or in navigation mode (both of which will be described in detail below), it is apparent that transducers 22 and 26 will be intermittently transmitting and receiving acoustic energy. In order to avoid sound saturation, or "ringing", the acoustic energy transmitted by transducers 22 and 26 must be timed properly. As illustrated in FIG. 5, frequency varied "chirps" can be emitted from one of transducer 22 and 26 for a period of 50µs. An echo gate of 83 ms can be set for receiving the chirps at other transducers 22 and 26 and finally a settling and computation time of 200ms can be allowed to elapse before transducers 22 or 26 emit a subsequent chirp. Assuming a maximum tank diameter of 400 feet, the echo gate is sufficient to allow a chirp to travel across the full diameter of the tank. Also, since the repeat period of chirping is 283.05 ms and a typical speed of vehicle 24 is 9 in./s, position measurements can be updated every 2.5 inches. This is acceptable in most applications. However, the timing of the chirps may be varied in order to meet particular application requirements.

Figure 7:
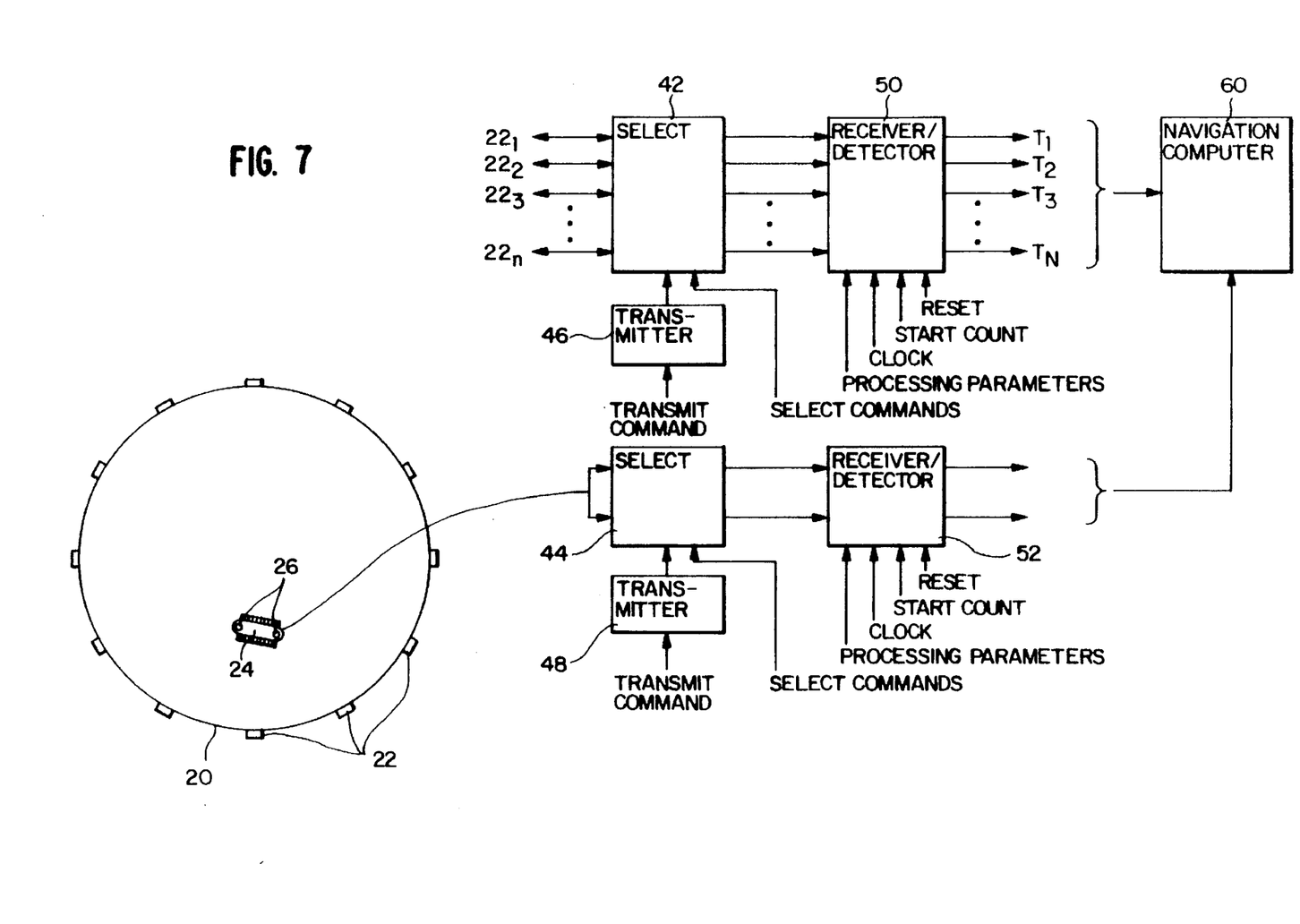
FIG. 7 illustrates the measurement and control system of the invention.

FIG. 7 is a block diagram of the measurement and control system utilized in the preferred embodiment. Acoustic signal processor 40 includes selector 42 which is coupled to each transducer 22 at points $22_1$ through $22_n$, respectively, and selector 44 which is coupled to transducers 26. Selector 42 is operative to select one or more of the transducers 22 for current transmission or reception of acoustic energy. Transmitter 46 is coupled to selector 42 and generates an electrical signal which causes the selected transducer(s) 22 to transmit acoustic energy during calibration mode in the manner described above. Transmitter 48 is coupled to selector 44 and generates a similar electrical signal which causes selected transducer(s) 26 to transmit acoustic energy in a similar manner during navigation mode and for verifying the results of calibration mode. Of course, the selectors 46 and 48 are also respectively operative to select desired ones of transducers 22 for reception of acoustic energy during navigation mode and a desired one of transducers 26 for reception for verifying the results of calibration mode.

Receiver/detector 50 is coupled to the outputs of selector 42, which correspond to detected acoustic energy at selected transducers 22 respectively, and calculates the respective travel times based on processing parameters downloaded from navigational computer 60. These processing parameters include threshold levels and gating parameters, for example. Receiver/detector 52 is coupled to the outputs of selector 44 and operates in a similar manner with respect to transducers 26. The various outputs of receiver/detectors 50 and 52, which correspond to various travel times, are inputted into navigational computer 60, which calculates the position of vehicle 24 based on a predetermined program which is not part of the invention. Of course, selectors 42 and 44, transmitters 46 and 48 and receiver/detectors 50 and 52 are all synchronized by a clock signal which is generated by navigational computer 60. In addition, navigational computer 60 provides supervisory control for all of the components of acoustic signal processor 40.

In operation, acoustic signal processor 40 operates as follows. During calibration mode, selector 42 selects each transducer 22, one at a time, for transmission of acoustic energy and each of the remaining transducers 22 for reception of the acoustic energy transmitted by the selected transducer 22. Simultaneously, receiver/detector 50 measures the various travel times between the selected transducer 22 and the remaining transducers 22. Because the relative positions of transducers 22 are known, the average acoustic velocity of the path between each of the transducers 22 can be calculated. After this procedure is accomplished with each transducer 22 being selected for transmission, the velocity profile of the fluid can be calculated by navigational computer 60 based on an appropriate algorithm.

Subsequently, selector 44 can select one of transducers 26 for transmission and the other transducer 26 for reception so as to allow the acoustic travel time between transducers 26 to be measured as vehicle 24 is moved to various positions. This provides a further check on the calculated velocity profile. If the measured travel time between transducers 26 does not correspond to the velocity profile, the calibration mode can be started again.

Figure 8A:
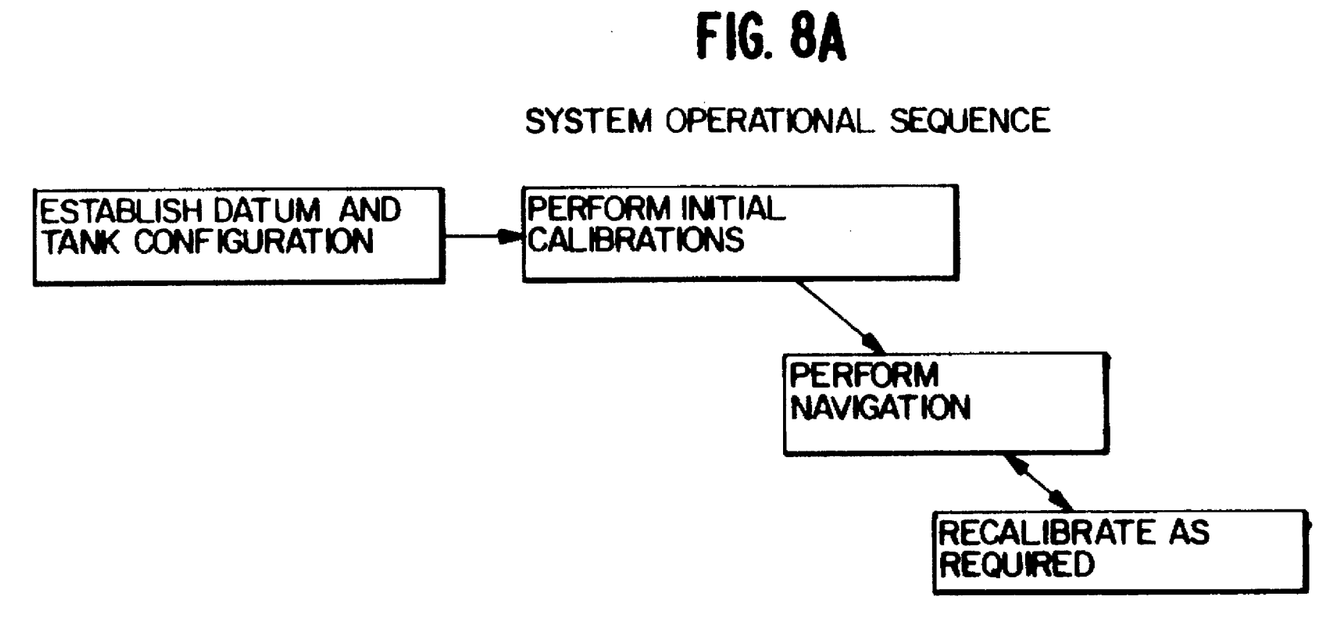
FIG. 8(A) illustrates the sequence of operations of the preferred embodiment.

FIG. 8(A) depicts the sequence of operation for the system. The first step is to establish a physical reference point, called the tank datum, to which all other positions are referred. The datum may be located arbitrarily, anywhere inside or outside of the tank. The second step is to perform initial calibration of the tank which characterizes the acoustic velocity environment and establishes velocity corrections for all areas of the tank, and also serves to generally determine which external transducers are useable from which areas of the tank. The third step is to operate the system for its intended purpose, in navigation mode. Data quality is determined by checking the characteristics of the raw received signals at the external transducers as a prefilter, and by tracking the statistics of the position error. A recalibration is performed when the position errors exceed a preset limit.

Establishing the tank configuration first requires locating all of the external transducers with respect to the tank datum. The tank itself is then oriented by aligning a scaled drawing of the tank to the tank datum and to the locations of the external transducers. This establishes a model of the tank in the computer.

Figure 8B:
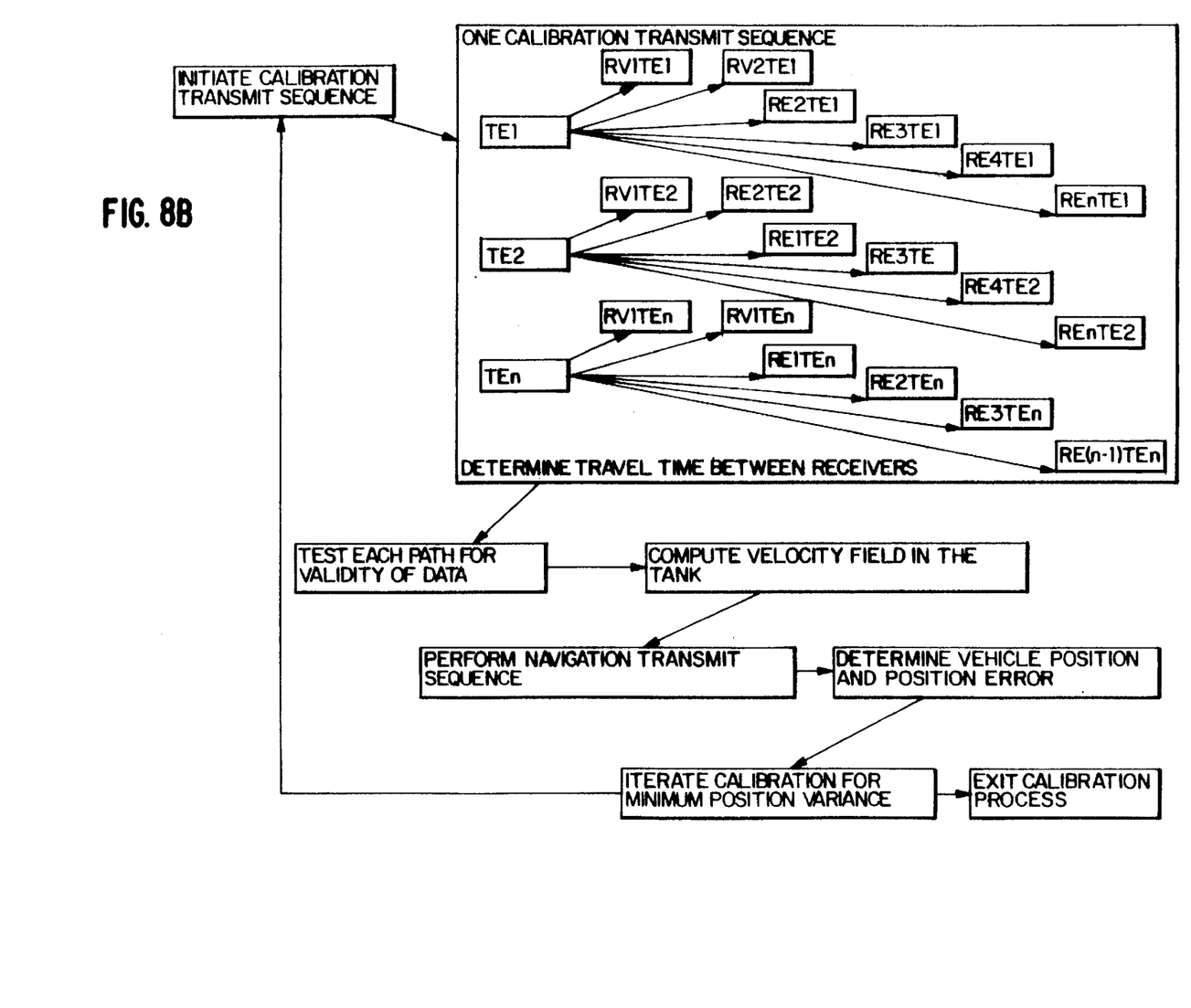
FIG. 8(B) illustrates the sequence of a calibration process of the preferred embodiment.

The initial calibration is performed by first initiating the calibration process shown in FIG. 8(B).

Wherein:

$Ej$=>jth external tank transducer $Vi$=>ith vehicle transducer $REjVk$=>receive on the jth external tank transducer the signal transmitted by the kth vehicle transducer $TEj$=>transmit from the jth external tank transducer $RViTEk$=>receive on the ith vehicle transducer the signal transmitted by the kth external tank transducer.

Each external transducer is activated in turn, and the transmitted pulse received on all other transducers. In some cases, the path to a given vehicle-mounted or external transducer may be blocked by structure in the tank, in other cases the arrival angle of the acoustic energy at an external transducer may be less than the critical angle. In either of these situations the quality of the signal at the receiving transducer may be insufficient for accurate determination of average velocity along the path.

Signal quality may be evaluated in a number of ways: Rise time, signal to noise ratio, variability in the determination of distance, time spread of the signal, and other techniques are possible. One calibration sequence yields a table of distance measurements between transducers. Multiple calibration sequences yields a statistical information for each measurement path, as well as an average velocity along each path. The multiplicity of paths permits a reconstruction of the velocity field using known tomographic techniques.

Multiple calibration runs during the initial calibration, with the vehicle repositioned each time, permits checking the precision of the calibration. This is accomplished by comparing the velocity in-situ as determined from the vehicle transducers to the velocity at the vehicle as determined by the tomographic process.

During navigation mode, transducers 26 are alternately selected for transmission by selector 44 and all of transducers 22 are selected for reception by selector 42. In this manner, the travel times are measured between each transducer 26 and the transducers 22 by receiver detector 50. The position of each transducer 26 is then calculated based on the travel times output from receiver/detector 50 and the calculated velocity profile. Accordingly, the position and orientation of vehicle 24 can be determined by navigational computer 60. Since there are a plurality of transducers 22 and thus a plurality of measured travel times, navigational computer 60 can discard travel time measurements which are not within predetermined limits or within a predetermined window with respect to the other measurements. For example, erroneous travel times measured through wall 20 or from bouncing off piping or other obstacles within the tank can be discarded.

Figure 8C:
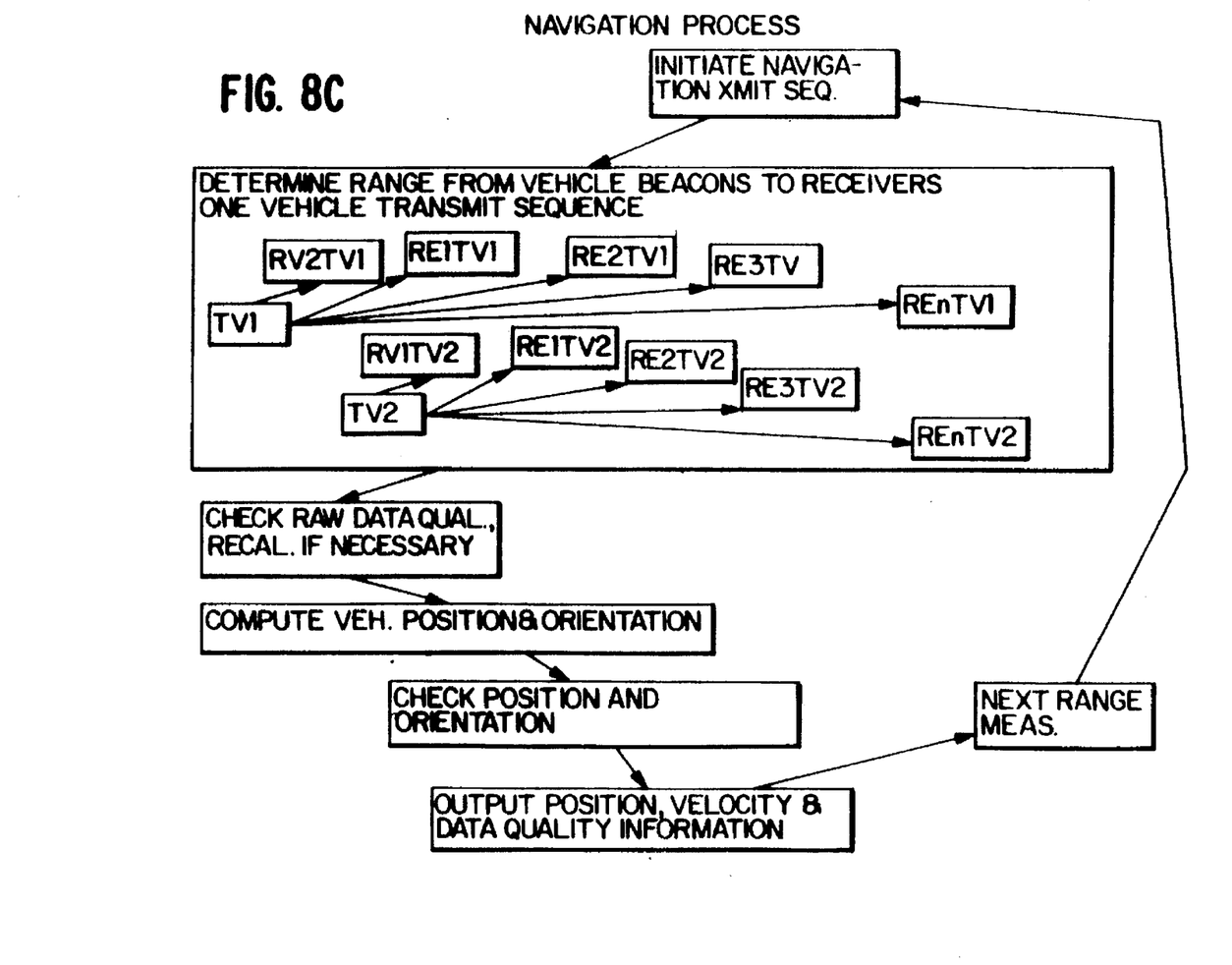
FIG. 8(C) illustrates the sequence of a navigation process of the preferred embodiment.

The navigation process is depicted in FIG. 8(C). Range is determined from each vehicle transducer to each external tank transducer. In addition, in-situ velocity measurements are made by measuring travel time between vehicle transducers, as a check on the computed velocity field from the latest calibration. Data quality is determined as described above, and good data are used to determine multiple estimates of the vehicle position and orientation for each vehicle transmit sequence. If data quality deteriorates below an arbitrarily selected value, a recalibration is performed to update the velocity field in the tank. It is to be noted that the preferred embodiment utilizes acoustic energy for measuring travel times. However, other types of energy in other frequency bands, such as radio frequency or light, could be utilized where appropriate. Also, the control and calculation algorithms can be modified as desired based on the particular application.

The invention may be applied to a three dimensional case where the "external" transducers are disposed so as to define a volume rather than a plane surface, as might be the case for a spherical tank or tank or enclosure of irregular shape. This arrangement would permit positioning of a vehicle or other device in three dimensions. Calibration of the acoustic velocity field within the volume would be accomplished in manner similar to that for the plane.

The invention is also applicable in non-tank environments such as the ocean, or in ponds, lakes, and the like. The method permits characterization of the acoustic velocity field and calibration of the environment in unenclosed or semi-enclosed areas, just as it does in enclosed areas such as tanks.

While the invention has been described through a preferred embodiment, various modifications can be made thereto without departing from the scope of the invention as defined by the appended claims.

What is claimed is:

1. An apparatus for determining a position of a device in an enclosure containing a fluid comprising:
    at least one first transducer disposed on the device so as to define a measuring point, said first transducer being capable of transmitting energy in response to a transmit signal and generating a reception signal in response to reception of energy;
    a plurality of second transducers disposed on an outer peripheral surface of said enclosure so as to define measuring points;
    means for detecting travel time of energy between each of said measuring points and all remaining ones of said measuring points, based on transmission and reception of energy by said first and second transducers, and thereby determine the position of said device.

2. An apparatus as claimed in claim 1 wherein said device is a vehicle.

3. An apparatus as claimed in claim 1 wherein said energy is acoustic energy.

4. An apparatus as claimed in claim 3 wherein said second transducers are arranged in a common plane with said first transducers.

5. An apparatus as claimed in claim 3 wherein there are two of said first transducers, said first transducers being a predetermined distance from each other.

6. An apparatus as claimed in claim 5 wherein said means for detecting can detect orientation of said device.

7. An apparatus as claimed in claim 3 wherein each of said second transducers are acoustically coupled to said outer surface by a fluid coupling.

8. An apparatus as claimed in claim 7, said fluid coupling comprising:
    a cavity defined by a housing of each of said transducers and said outer peripheral surface; and
    a fluid disposed in each said cavity.

9. An apparatus as claimed in claim 3, said detecting means further comprising:
    first selecting means for selectively designating at least one of said first transducers for one of transmitting and receiving acoustic energy;
    first generating means coupled to said first selecting means for generating said transmit signal and applying said transmit signal to any first transducer selected for transmitting acoustic energy;
    second selecting means for selecting at least one of said second transducers for one of transmitting and receiving acoustic energy;
    second generating means coupled to said second selecting means for generating said transmit signal and applying said transmit signal to any second transducer selected for transmitting acoustic energy; and
    timing means for synchronizing said first generating means, said second generating means, said first selector means and said second selector means; and
    measuring means for receiving reception signals generated by respective ones of said first and second transducers and processing said reception signals in a predetermined manner.

10. An apparatus as claimed in claim 9, further comprising:
    calibration means for causing said second selector means to assume a calibration mode wherein each of said second transducers are successively selected for transmitting acoustic energy and the remaining ones of said second transducers are selected for receiving acoustic energy, said calibration means calculating a velocity profile of the liquid in the enclosure based on acoustic travel times measured during said calibration mode.

11. An apparatus as claimed in claim 10, further comprising:
    calibration verifying means for causing said first selector to select a first one of said first transducers for transmitting acoustic energy and a second one of said first transducers for receiving acoustic energy, said calibration verifying means verifying said velocity profile base on acoustic travel time between said first and second ones of said first transducers.

12. An apparatus as claimed in claim 9, further comprising:
    position determining means for causing said first and second selectors to assume a position detection mode wherein said first selector selects one of said first transducers for transmitting acoustic energy and said second selector selects all of said second transducers for receiving acoustic energy, said position determining means determining the position of said device based on acoustic travel times measured between said first transducer selected for transmitting and each of said second transducers.

13. An apparatus as claimed in claim 12 wherein there are at least two of said first transducers, said position determining means causing said first selector to sequentially select said first transducers for transmitting acoustic energy, said position determining means also determining the orientation of said device based on acoustic travel times measured between each of said first transducers and said second transducers.

14. An apparatus as claimed in claim 1, wherein each of said second transducers comprise:
    a housing;
    a seal member disposed on said housing and being in contact with said outer peripheral surface;
    at least one transducer element disposed within said housing; and
    a fluid disposed in a cavity defined by said housing and said outer peripheral surface for providing communication between said transducer element and said outer peripheral surface.

15. An apparatus as claimed in claim 14, wherein said fluid is one of water and oil.

16. A process for determining position of a device in an enclosure containing fluid, at least one first transducer being disposed on said device, a plurality of second transducers being disposed on an outer surface of said enclosure, said first and second transducers defining a substantially common plane, said method comprising the steps of:
  transmitting energy from one of said first transducers;
  receiving energy at each one of said second transducers;
  determining first travel times for energy between said one of said first transducers and each of said second transducers; and
  determining the position of said device based on said first travel times.

17. A method as claimed in claim 16 wherein said energy is acoustic energy.

18. A method as claimed in claim 16, further comprising the steps of:
  transmitting energy successively from each one of said second transducers;
  receiving energy at remaining ones of said second transducers;
  determining second travel times for energy between each of said second transducers and remaining ones of said second transducers; and
  determining an energy velocity profile within said enclosure based on said second travel times.

19. A method as claimed in claim 18, further comprising the steps of;
  transmitting energy again from one of said first transducers;
  receiving energy at the other of said first transducers;
  determining a third travel time for energy between said one and the other of said first transducers; and
  correcting or verifying said velocity profile based on said third travel time.

20. A method as claimed in claim 18 wherein said energy is acoustic energy.

21. A system having a vehicle adapted to be navigated within an interior of a liquid-filled tank, said system comprising:
  means for causing the vehicle to be remotely controlled and tracked from a position outside of said tank, said vehicle comprising:
    a body;
    means for causing said body to move within the interior of the tank;
    at least two transducers mounted at predetermined positions on said body;
    means for radiating energy from at least one of said transducers;
    means for receiving the energy at least a second one of said transducers said means for receiving including means for measuring the acoustic travel time between said at least one of said transducers and said at least second one of said transducers.

22. A vehicle as claimed in claim 21 wherein the energy is acoustic energy.

23. A device for verifying a velocity profile of a liquid in an enclosure which has been calculated based on acoustic travel across various paths through said liquid, said device comprising:
  a vehicle;
  means for moving the vehicle within the enclosure;
  at least two acoustic transducers mounted on said vehicle; and
  means for transmitting acoustic energy from one of said transducers and receiving the acoustic energy at another of said transducers, said transmitting means including means for verifying the velocity profile based on acoustic travel time between said one and said another of said acoustic transducers.

24. A method of calibrating a position detection system which detects position of a device which is in a fluid contained in an enclosure, said method comprising the steps of:
  measuring acoustic travel time across a plurality of paths through said liquid;
  calculating a velocity profile based on the travel times measured in said measuring step; and
  changing parameters used in said measuring step based on said velocity profile, said parameters relating to the fluid.

25. An apparatus for determining a position of a moving vehicle in a fluid comprising:
  at least one first transducer disposed on the moving vehicle so as to define a measuring point, said first transducer being capable of transmitting energy in response to a transmit signal and generating a reception signal in response to reception of energy;
  a plurality of second transducers operatively coupled with said fluid to define measuring points;
  means for detecting travel time of energy between each of said measuring points and all remaining ones of said measuring points, based on transmission and reception of energy by said first and second transducers, and thereby determine the position of said moving vehicle.

26. An apparatus as claimed in claim 25 wherein said energy is acoustic energy.

27. An apparatus as claimed in claim 26 wherein said second transducers are arranged in a common plane with said first transducers.

28. An apparatus as claimed in claim 26 wherein there are two of said first transducers, said first transducers being a predetermined distance from each other.

29. An apparatus as claimed in claim 28 wherein said means for detecting includes means for determining orientation of said device.

30. An apparatus as claimed in claim 26, said detecting means further comprising:
  first selecting means for selectively designating at least one of said first transducers for one of transmitting and receiving acoustic energy;
  first generating means coupled to said first selecting means for generating said transmit signal and applying said transmit signal to any first transducer selected for transmitting acoustic energy;
  second selecting means for selecting at least one of said second transducers for one of transmitting and receiving acoustic energy;
  second generating means coupled to said second selecting means for generating said transmit signal and applying said transmit signal to any second transducer selected for transmitting acoustic energy; and
  timing means for synchronizing said first generating means, said second generating means, said first selector means and said second selector means; and
  measuring means for receiving reception signals generated by respective ones of said first and second transducers and processing said reception signals in a predetermined manner.

31. An apparatus as claimed in claim 30, further comprising:

calibration means for causing said second selector means to assume a calibration mode wherein each of said second transducers are successively selected for transmitting acoustic energy and the remaining ones of said second transducers are selected for receiving acoustic energy, said calibration means calculating a velocity profile of the liquid based on acoustic travel times measured during said calibration mode.

32. An apparatus as claimed in claim 31, further comprising:

calibration verifying means for causing said first selector to select a first one of said first transducers for transmitting acoustic energy and a second one of said first transducers for receiving acoustic energy, said calibration verifying means verifying said velocity profile based on acoustic travel time between said first and second ones of said first transducers.

33. An apparatus as claimed in claim 30, further comprising:

position determining means for causing said first and second selectors to assume a position detection mode wherein said first selector selects one of said first transducers for transmitting acoustic energy and said second selector selects all of said second transducers for receiving acoustic energy, said position determining means determining the position of said device based on acoustic travel times measured between said first transducer selected for transmitting and each of said second transducers.

34. An apparatus as claimed in claim 33 wherein there are at least two of said first transducers, said position determining means causing said first selector to sequentially select said first transducers for transmitting acoustic energy, said position determining means also determining the orientation of said device based on acoustic travel times measured between each of said first transducers and said second transducers.

* * * * *